(12) United States Patent
Tsai et al.

(10) Patent No.: US 7,563,040 B2
(45) Date of Patent: Jul. 21, 2009

(54) BUILT-IN WEBCAM

(75) Inventors: Wen-Ji Tsai, Taipei Shien (TW);
Yi-Chun Lin, Taipei Shien (TW);
Wan-Chi Lin, Taichung (TW);
Jung-Wen Chang, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 488 days.

(21) Appl. No.: 11/464,031

(22) Filed: Aug. 11, 2006

(65) Prior Publication Data
US 2007/0253703 A1 Nov. 1, 2007

(30) Foreign Application Priority Data
May 1, 2006 (TW) .............................. 95115462 A

(51) Int. Cl.
*G03B 17/00* (2006.01)
*G03B 17/48* (2006.01)
*H04N 5/225* (2006.01)

(52) U.S. Cl. ...................... 396/428; 396/419; 396/429; 348/374

(58) Field of Classification Search ................. 396/419, 396/428, 429, 535, 541; 361/679, 683, 686; 348/207.1, 207.11, 373, 374, 375; 248/176.1, 248/187.1, 229
See application file for complete search history.

(56) References Cited

U.S. PATENT DOCUMENTS

| | | | | |
|---|---|---|---|---|
| 5,801,919 A | * | 9/1998 | Griencewic | 361/683 |
| 5,880,928 A | * | 3/1999 | Ma | 361/683 |
| 5,987,122 A | * | 11/1999 | Daffara et al. | 349/433.13 |
| 6,323,902 B1 | * | 11/2001 | Ishikawa | 348/373 |
| 6,731,340 B1 | * | 5/2004 | Lai | 348/373 |
| 6,788,529 B2 | * | 9/2004 | Homer et al. | 361/683 |
| 6,812,958 B1 | * | 11/2004 | Silvester | 348/207.1 |

FOREIGN PATENT DOCUMENTS

CN 2745106 12/2005
CN 1747490 3/2006

OTHER PUBLICATIONS

English Abstract of CN2745106.
English Abstract of CN1747490.

* cited by examiner

*Primary Examiner*—Kenneth J Whittington
(74) *Attorney, Agent, or Firm*—Thomas, Kayden, Horstemeyer & Risley

(57) ABSTRACT

A webcam built in an electronic device includes a housing, a video camera, and a latching mechanism. The video camera is movable between a first location in the housing and a second location outside the housing. The latching mechanism maintains the video camera at the first location and the second location.

14 Claims, 10 Drawing Sheets

BUILT-IN WEBCAM

BACKGROUND OF THE INVENTION

1. Field of the Invention

The invention relates to an electronic device with a built-in webcam, and in particular relates to a built-in webcam which includes a video camera with more than one degree of rotation for easy adjustment of filming angles and capable of being received in the electronic device when not in use to avoid contamination.

2. Description of the Related Art

Currently, external and internal webcams are available.

An external webcam is disposed outside a computer or other information technology (IT) products, and thus has less space limitations in use. Furthermore, an external webcam has a simpler structure and more flexible adjustment of the orientation and elevation than an internal webcam.

An internal webcam is generally mounted in a portable computer, and can only be rotated about a single axis for changing the elevation angle. Thus, users usually need to adjust their position to be filmed by the webcam. Such an operation is not convenient. Furthermore, the lens of an internal webcam is exposed to the atmosphere without any means of protection and is thus easily contaminated by dust and fingerprints.

BRIEF SUMMARY OF THE INVENTION

The invention provides a built-in webcam for an electronic device. The webcam includes a video camera with more than one degree of rotation for easy adjustment of filming angles and capable of being received in the electronic device when not in use to avoid contamination.

The webcam of the invention includes a housing, a video camera, a latching mechanism, and a support stand. The video camera is movable between a first location in the housing and a second location outside the housing. The housing protects the video camera at the first location from contaminants. The latching mechanism maintains the video camera at the first location and the second location.

The support stand is movably disposed in the housing. The video camera is rotatably mounted on the support stand.

The support stand includes a first neck part. The video camera includes a first cover, a second cover, a third cover, and a fourth cover. The first cover and the second cover respectively include first indentations which constitute a first hole, allowing the first neck part to pass through. The third cover and the fourth cover respectively include second neck parts. The first cover and the second cover further include second indentations which constitute a second hole, allowing the second neck parts to pass through. Thus, the third cover and the fourth cover are rotatable with respect to the first cover and the second cover.

From the above descriptions, the first and second covers of the video camera are rotatable with respect to the support stand. Also, the third and fourth covers are rotatable with respect to the first and second covers. It is understood that the video camera has more than one degree of rotation for easy adjustment of the filming angles in operation to meet user requirements.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

A portable computer is used for introducing a preferred embodiment of the invention. It is understood, however, that the invention is applicable to other electronic devices.

Figure 1A:
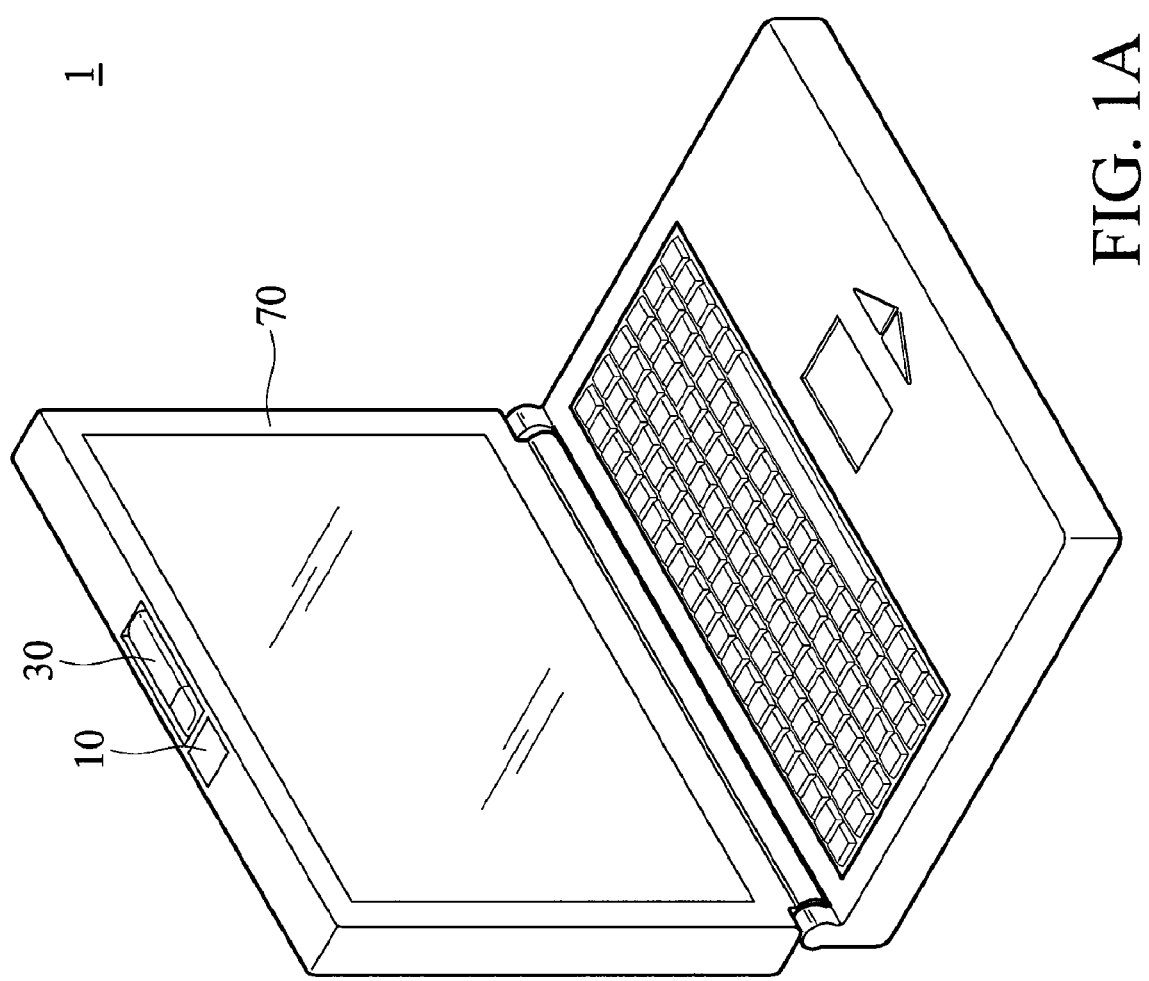
FIGS. 1A, 1B, and 1C depict operation of a built-in webcam of a portable computer in accordance with the invention.
Figure 1B:
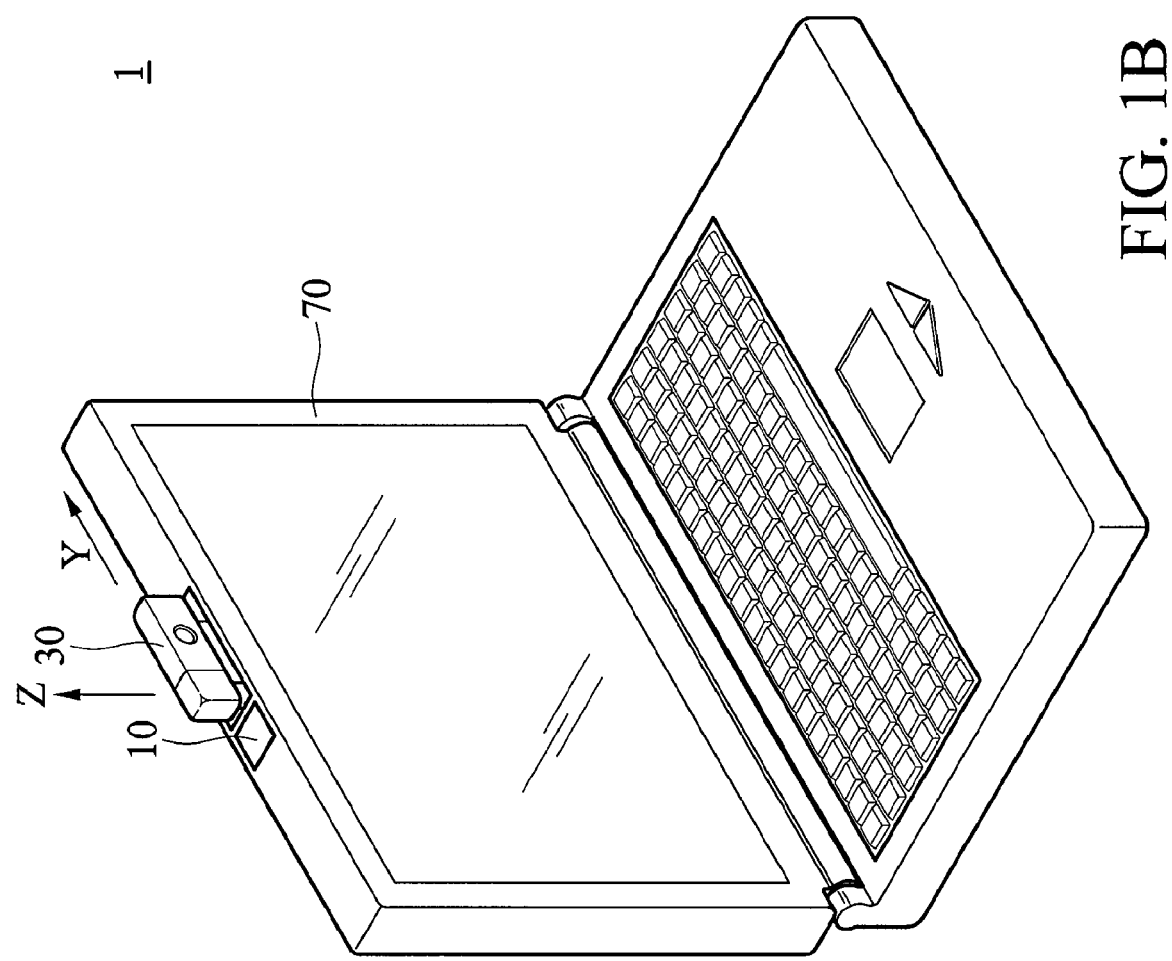
Figure 1C:
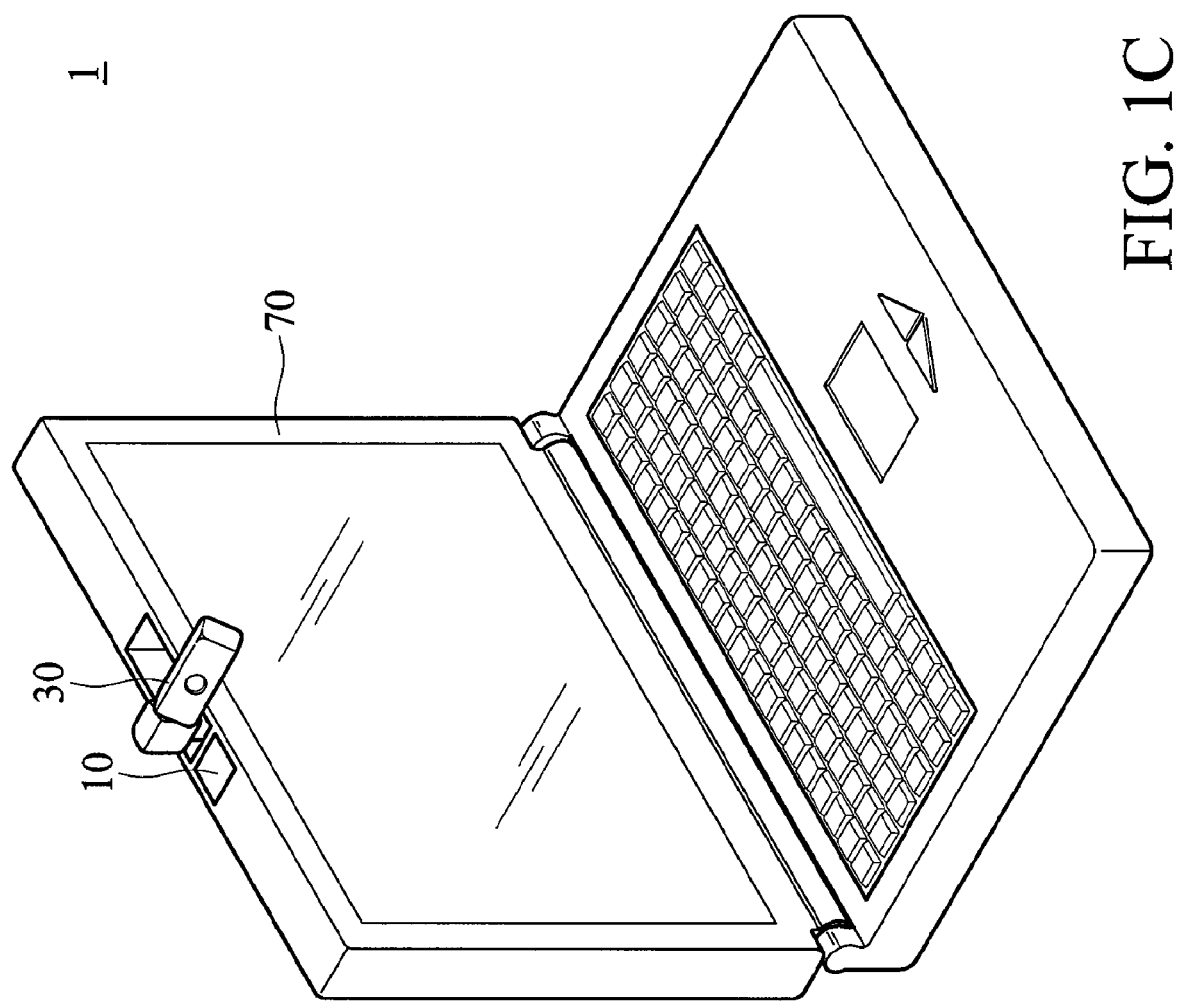

Referring to FIG. 1A, a portable computer 1 has a monitor 70 and a built-in webcam disposed at the top of the monitor 70. To use a video camera 30 of the webcam, the user presses a latching mechanism 10 as shown in FIG. 1B, to eject the video camera 30 from the monitor 70. The video camera 30 can be rotated about a Y-axis and a Z-axis as shown in FIG. 1C, for adjusting the filming angles of the video camera 30.

In a retraction operation, the video camera 30 is returned to the position as shown in FIG. 1B. Then, the latching mechanism 10 is pressed, the video camera 30 is pressed into the monitor 70, and the latching mechanism 10 is released to maintain the video camera 30 in the monitor 70. The detailed structure of the webcam is introduced in the following.

Figure 2:
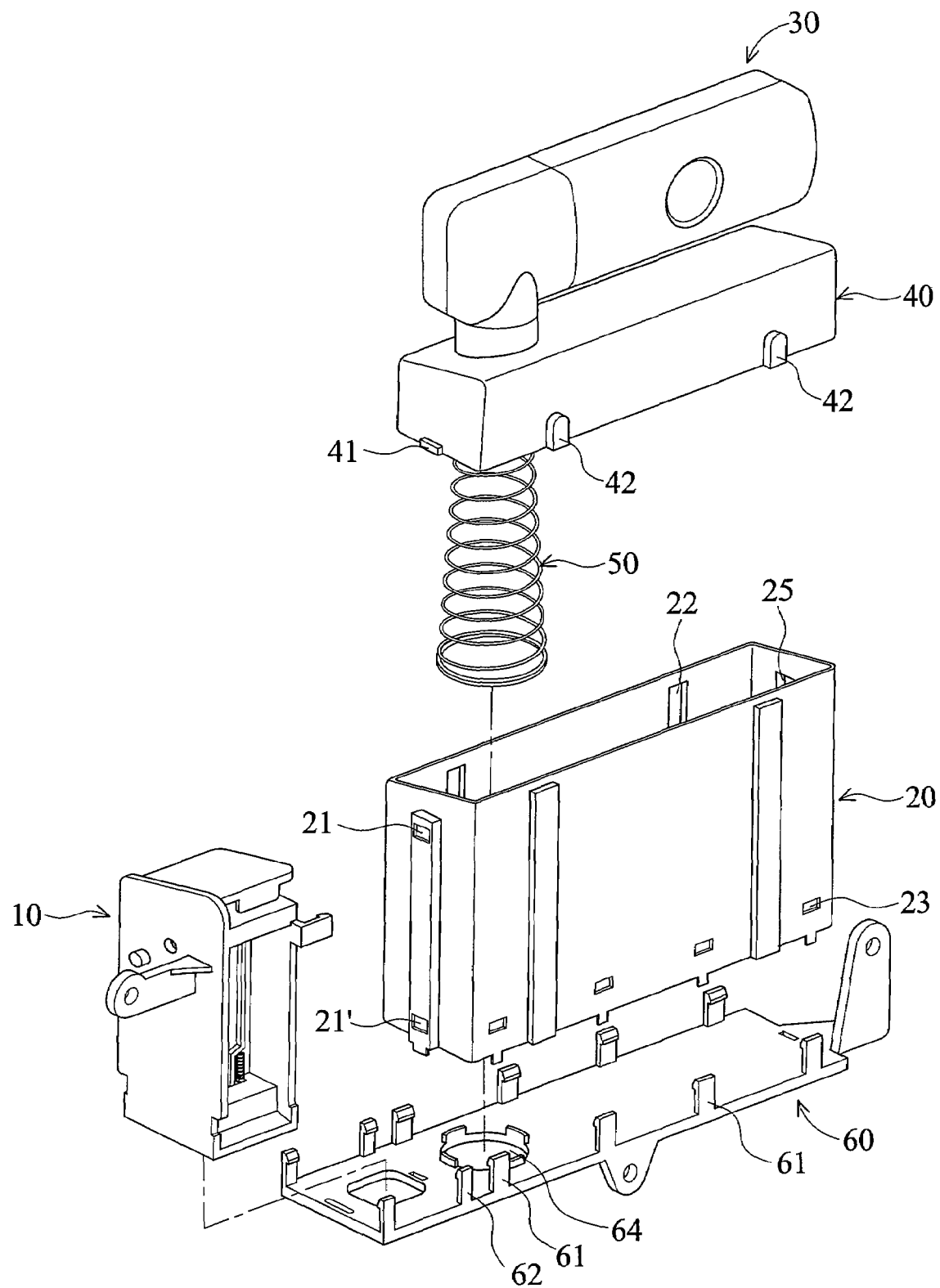
FIG. 2 is an exploded perspective diagram of the built-in webcam in accordance with the invention.

Referring to FIG. 2, the webcam of the invention includes a latching mechanism 10, a housing 20, a video camera 30, a support stand 40, at least one spring 50, and a bottom cover 60.

The housing 20 is substantially rectangular, with through holes 23 provided on the longer sides and through holes 21 and 21' provided on the shorter sides. Furthermore, a plurality of parallel grooves 22 and 25 are provided on inner walls of the housing 20.

The bottom cover 60 is fixed in the monitor 70 of the portable computer 1 and has hooks 61 and 62 on its edges. The housing 20 is fixed to the bottom cover 60 via engagement of the hooks 61 with the through holes 23. The latching mechanism 10 is fixed to the bottom cover 60 via engagement of the hooks 62 with the bottom of the latching mechanism 10. Furthermore, an opening 64 is provided on the bottom cover 60 for a power and signal cable (not shown) to pass through.

The support stand 40 supports the video camera 30 and has a plurality of bumps 41 and 42 on its bottom. The bumps 41 and 42 are disposed in the grooves 25 and 22 of the housing 20. When the support stand 40 slides in the housing 20, the bumps 41 and 42 on the support stand 40 slide in the grooves 25 and 22.

An end of the spring 50 abuts the support stand 40, while the other end abuts the bottom cover 60. When the video camera 30 stays in the housing 20, the spring 50 is compressed. The restoring force of the spring 50 is used for ejecting the video camera 30 from the housing 20.

The latching mechanism 10 is used for maintaining the video camera 30 at a first location in the housing 20 and at a second location outside the housing 20. In the following, the detailed structure of the latching mechanism 10, the actions of all of the elements of the latching mechanism 10, and the process of positioning the video camera 30 by the latching mechanism 10 are described in order.

Figure 3:
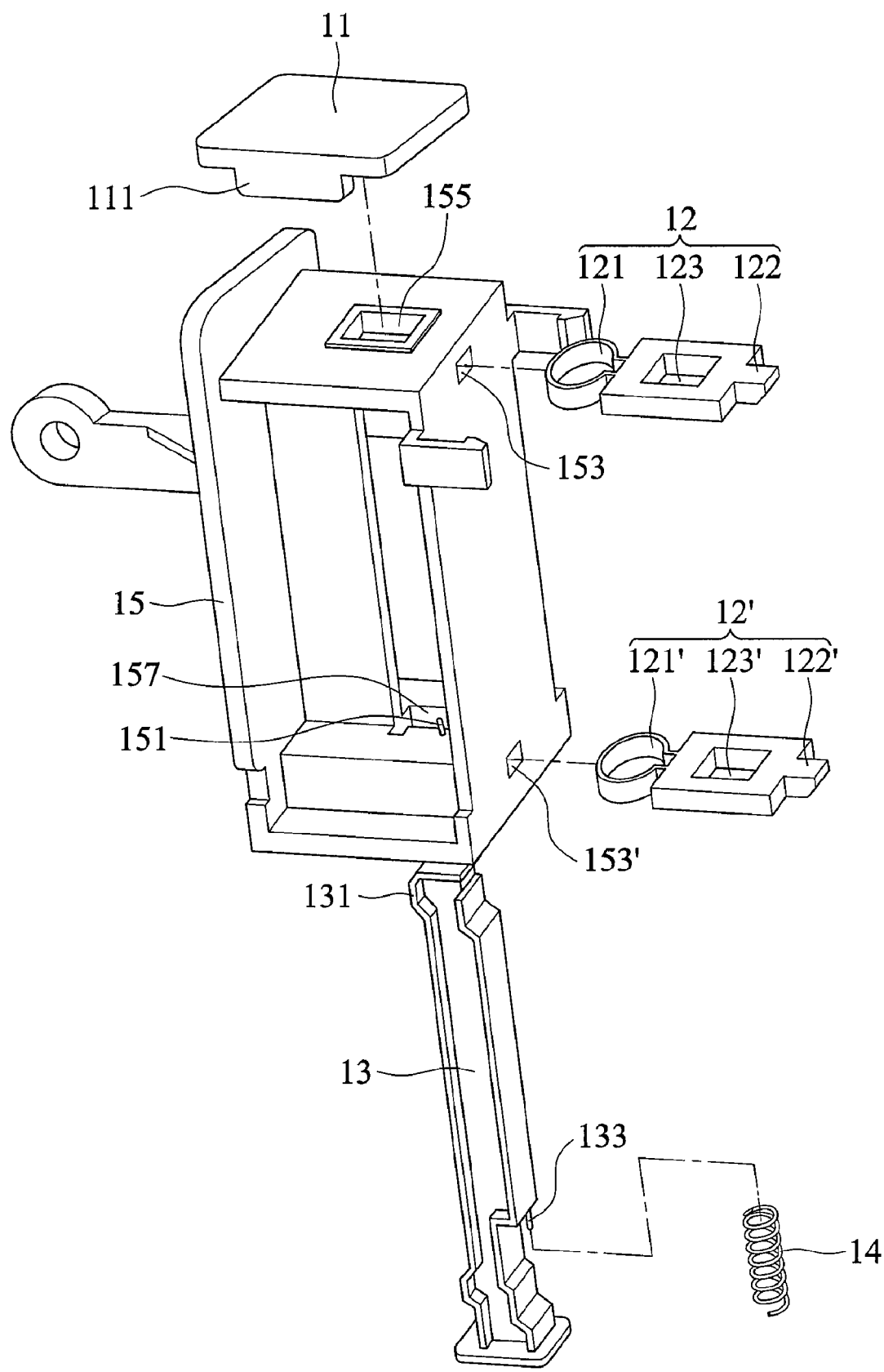
FIG. 3 is an exploded perspective diagram of a latching mechanism of the built-in webcam in accordance with the invention.

FIG. 3 is an exploded perspective diagram of the latching mechanism. The latching mechanism 10 includes a button 11, a frame body 15, two latches 12 and 12', a connecting link 13, and a spring 14. The latches 12 and 12' are disposed in the frame body 15. The latches 12 and 12' have end parts 122 and 122' protruding from the frame body 15 through the openings 153 and 153', and resilient parts 121 and 121' abutting the inner wall of the frame body 15. The connecting link 13 passes through an opening 157 of the frame body 15, through holes 123' and 123 of the latches 12' and 12, and an opening 155 of the frame body 15. A hook 131 of the connecting link 13 engages a hook 111 of the button 11. The spring 14 abuts the connecting link 13 and the inner wall of the frame 15, wherein a pin 133 of the connecting link 13 extends downward and a pin 151 of the frame body 15 extends upward to position the spring 14.

Figure 4B:
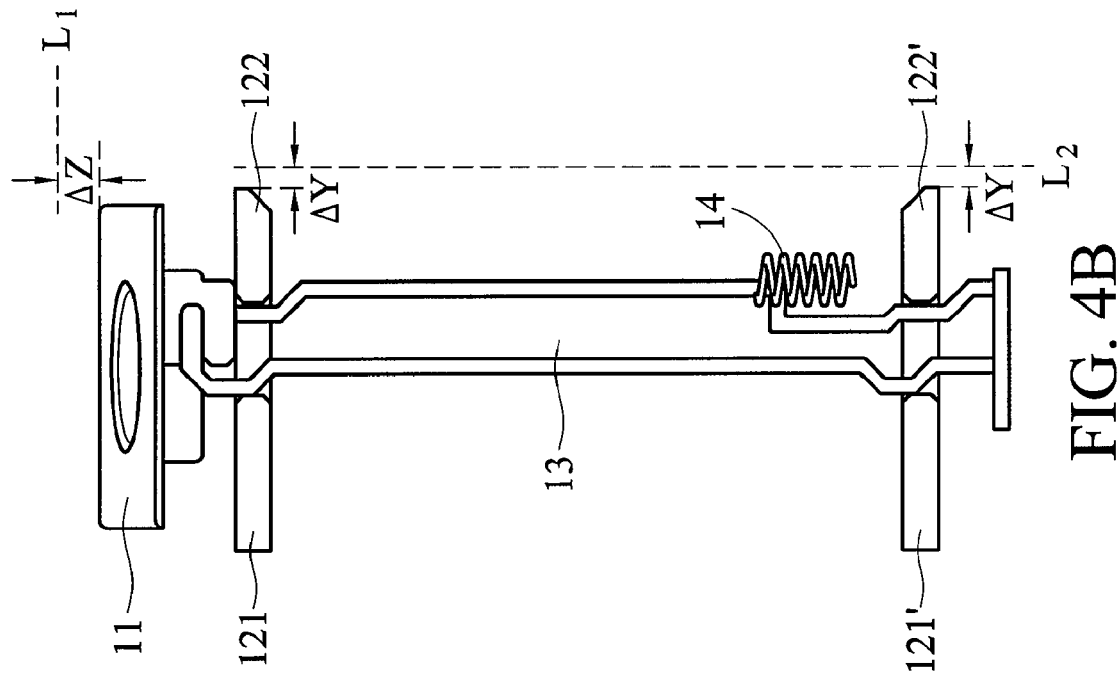
FIGS. 4A and 4B depict operation of the latching mechanism of FIG. 3.
Figure 4A:
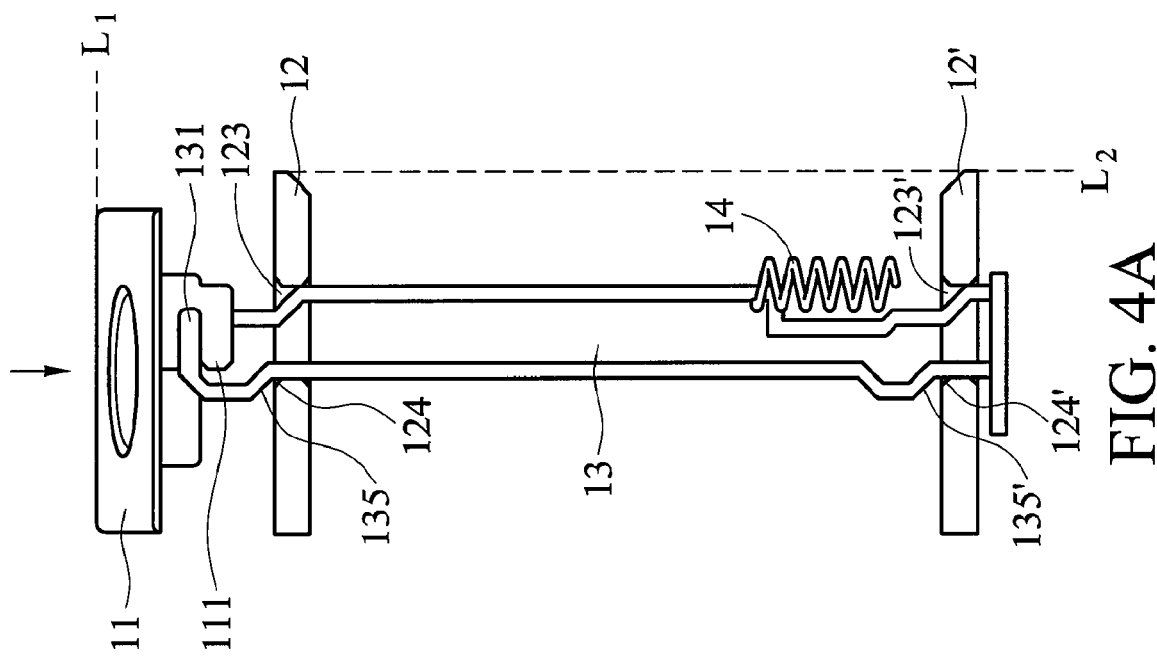

Referring to FIGS. 4A and 4B, the connecting link 13 includes first inclined surfaces 135 and 135'. The latches 12 and 12' include through holes 123 and 123' and second inclined surfaces 124 and 124' in the through holes 123 and 123'. When the button 11 is pressed at a distance $\Delta Z$ from a reference line $L_1$, the connecting link 13 is moved downward along with the button 11. Meanwhile, the first inclined surfaces 135 and 135' of the connecting link 13 push the second inclined surfaces 124 and 124' in the through holes 123 and 123' of the latches 12 and 12', so that the latches 12 and 12' are moved to the left in FIG. 4B at a distance $\Delta Y$ from a reference line $L_2$. Thus, the resilient parts 121 and 121' against the inner wall of the frame body 15 are compressed, and the end parts 122 and 122' protruding through the openings 153 and 153' are retracted within the frame body 15. When the button 11 is released, the latches 12 and 12' return to the reference line $L_2$ via the restoring forces of the resilient parts 121 and 121'.

The support stand 40 is fastened by the lower latch 12' when the video camera 30 stays in the housing 20, where the end part 122' of the lower latch 12' contacts the bump 41 of the support stand 40 to resist the restoring force of the spring 50. When the button 11 of the latching mechanism 10 is pressed, the end parts 122 and 122' of the latches 12 and 12' are simultaneously retracted within the frame body 15 to release the support stand 40. Then, the video camera 30 is ejected from the housing 20 by the spring 50, as shown in FIG. 1B. The button 11 is then released to project the latches 12 and 12' through the openings 153 and 153' of the frame body 15. Thus, the bump 41 of the support stand 40 is supported by the end part 122 of the upper latch 12 to position the video camera 30.

In the operation of retracting the video camera 30, the button 11 is pressed to retract the latches 12 and 12' within the frame body 15 thus removing the support of the end part 122 to the bump 41. Then, the video camera 30 is pressed into the housing 20. Then, the button 11 is released to project the latches 12 and 12' from the frame body 15. Thus, the latch 12' positions the support stand 40, with the end part 122' contacting the bump 41, and resists the storing force of the spring 50.

Figure 5:
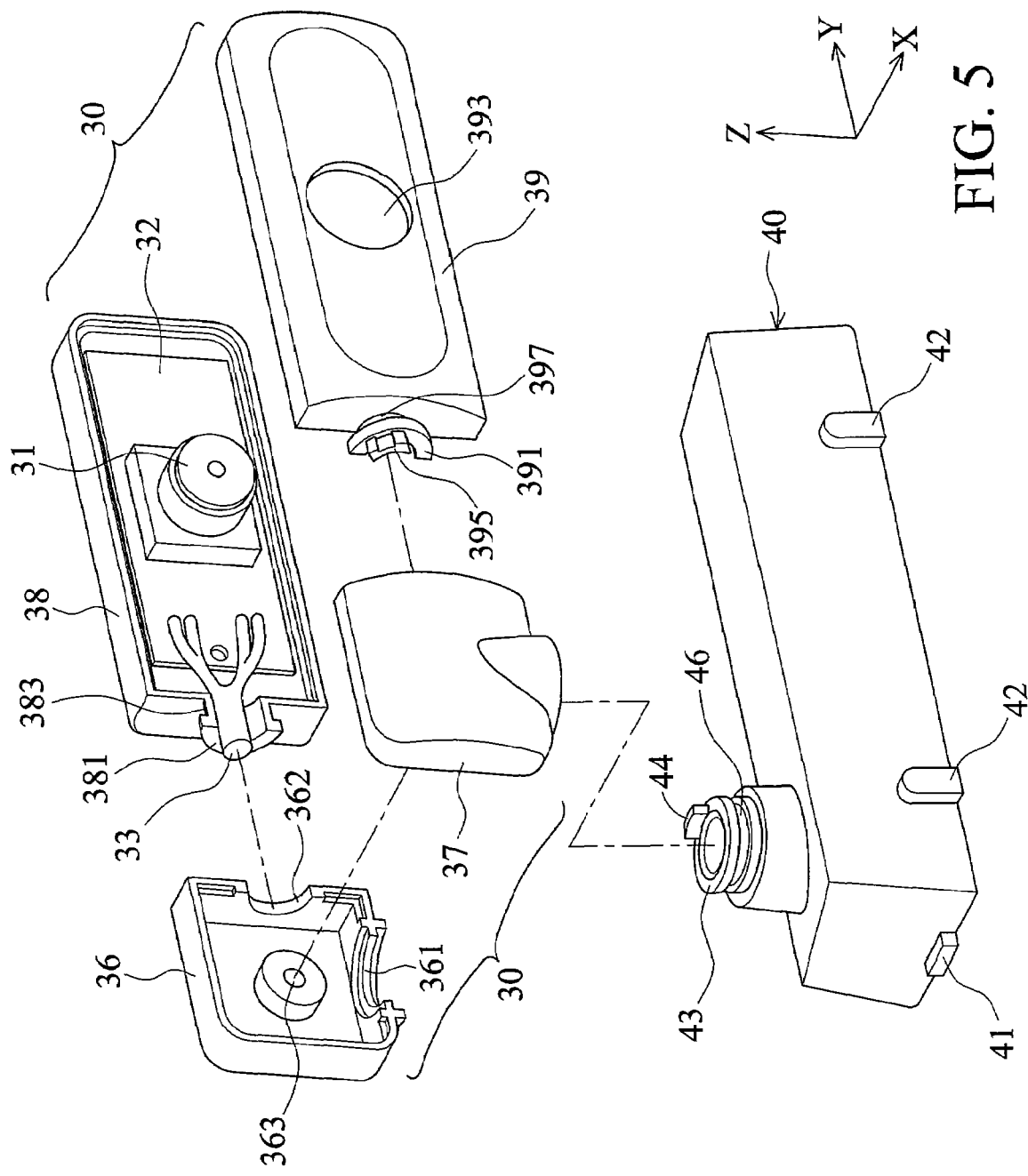
FIG. 5 is an exploded perspective diagram of a video camera of the built-in webcam in accordance with the invention.

Referring to FIG. 5, the video camera 30 includes a first cover 36, a second cover 37, a third cover 38, a fourth cover 39, a printed circuit board 32, a lens 31, and a power and signal cable 33. The printed circuit board 32 is disposed between the third cover 38 and the fourth cover 39. The lens 31 is mounted on the printed circuit board 32. The fourth cover 39 defines an opening 393 to expose the lens 31. Further referring to FIG. 6, the first cover 36 and the second cover 37 respectively include semi-circular first indentations 361, 373 and second indentations 362, 375. The first indentations 361 and 373 constitute a first hole for a first neck part 46 of the support stand 40 to pass through. This arrangement allows the video camera 30 to rotate about the Z axis. Furthermore, the second indentations 362 and 375 constitute a second hole for second neck parts 383 and 397 of the third and fourth covers 38 and 39 to pass through. This arrangement allows the video camera 30 to rotate about the Y-axis.

It is noted that the first cover 36 includes a threaded hole 363 and the second cover 37 includes a threaded post 377 corresponding to the threaded hole 363. The first, second, third, and fourth covers 36, 37, 38, and 39 are assembled via a single screw (not shown) which is passed through the threaded hole 363 into the threaded post 377.

The support stand 40 includes a flange 43 preventing separation of the video camera 30 therefrom. Also, the third and fourth covers 38 and 39 have flanges 381 and 391 preventing separation of the first and second covers 36 and 37 therefrom.

The power and signal cable 33 extends from the printed circuit board 32, through the chamber formed by the first and second covers 36 and 37, the hollow support stand 40 and the opening 64 of the bottom cover 60, to a printed circuit board (not shown) of the portable computer 1. For clarity, FIG. 5 only shows a part of the power and signal cable 33.

Figure 6:
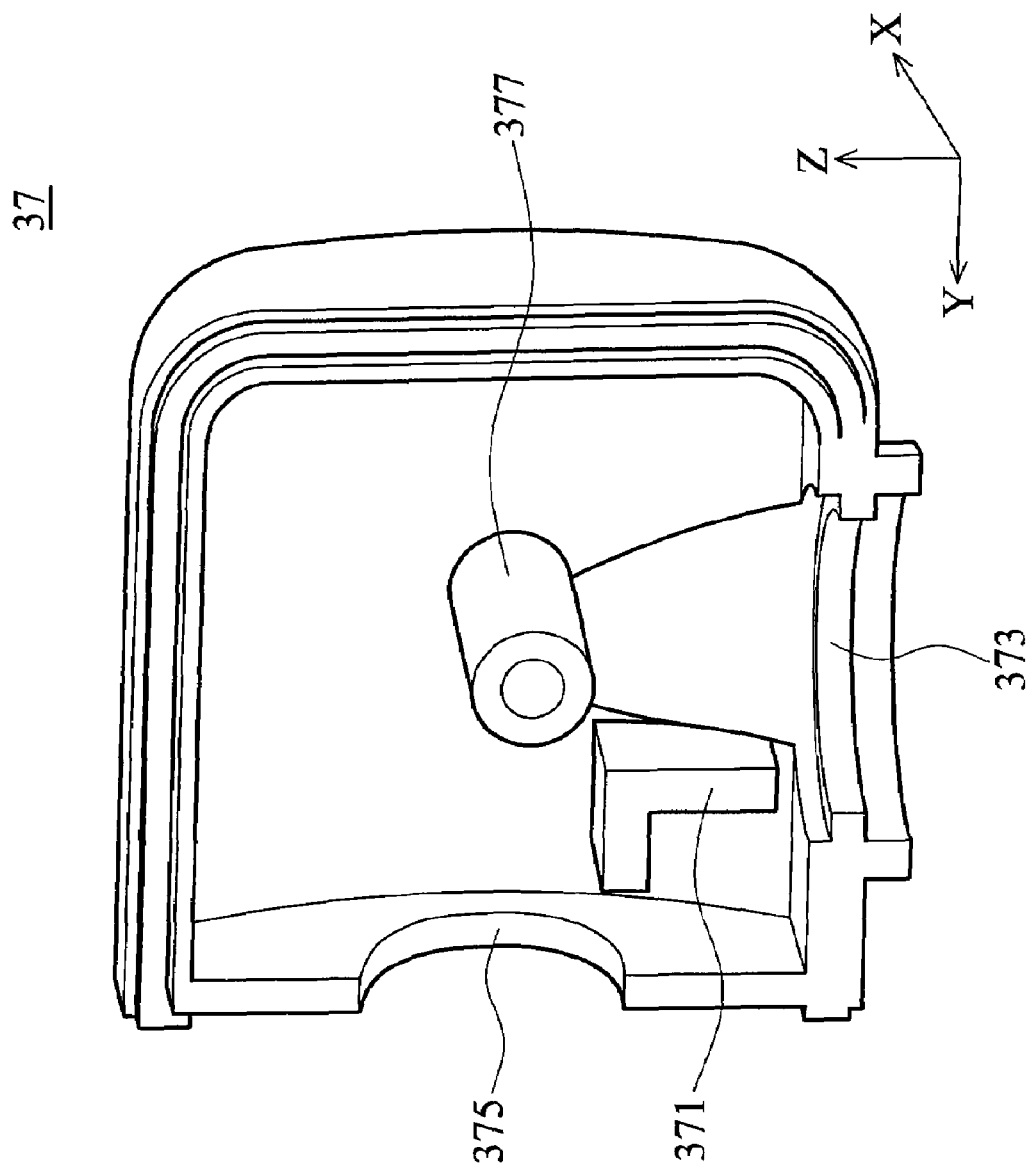
FIG. 6 is a perspective diagram of a second cover of the video camera, observed in a direction X of FIG. 5.
Figure 7B:
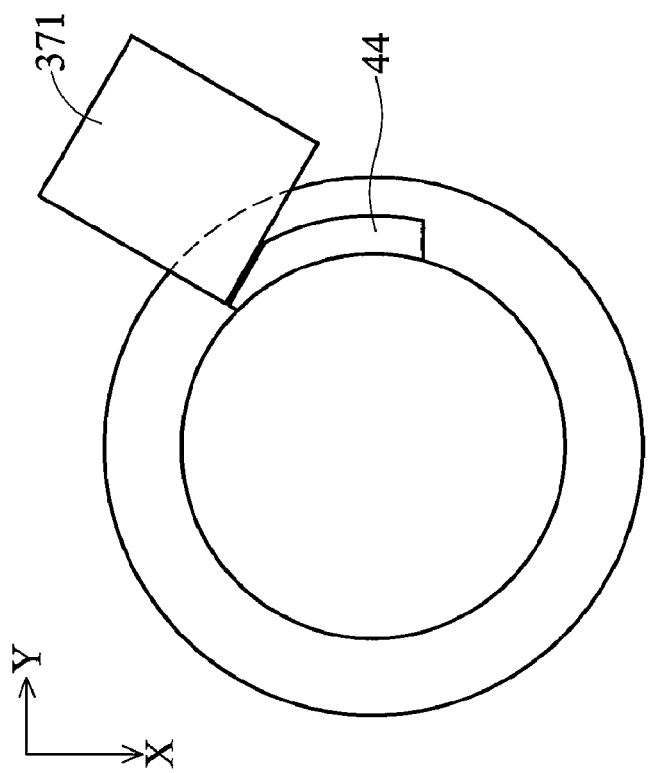
FIGS. 7A and 7B show the relationship of a first protrusion and a second protrusion in the assembled video camera, observed in a direction—Z.
Figure 7A:
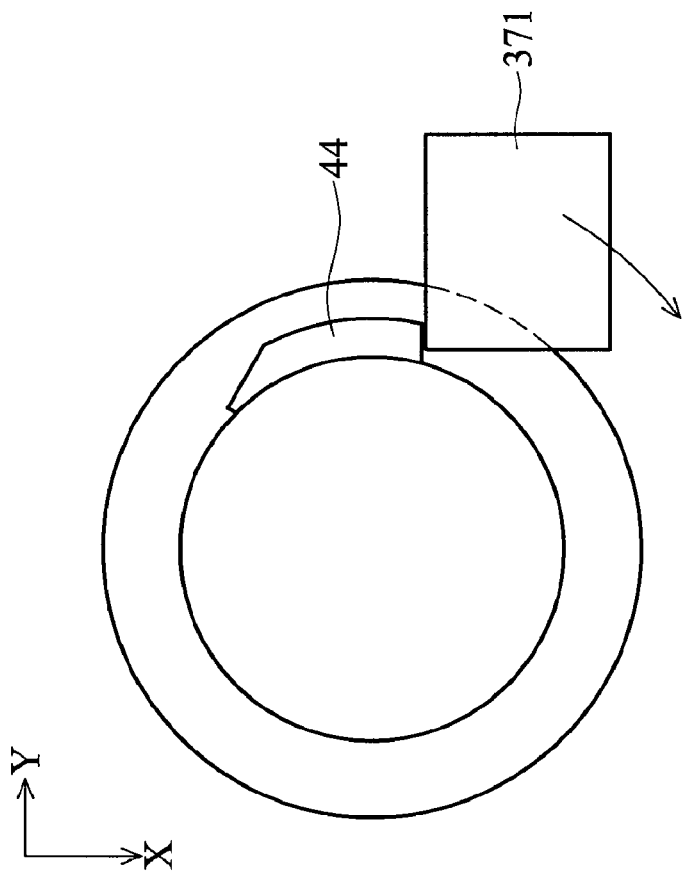
Figure 8B:
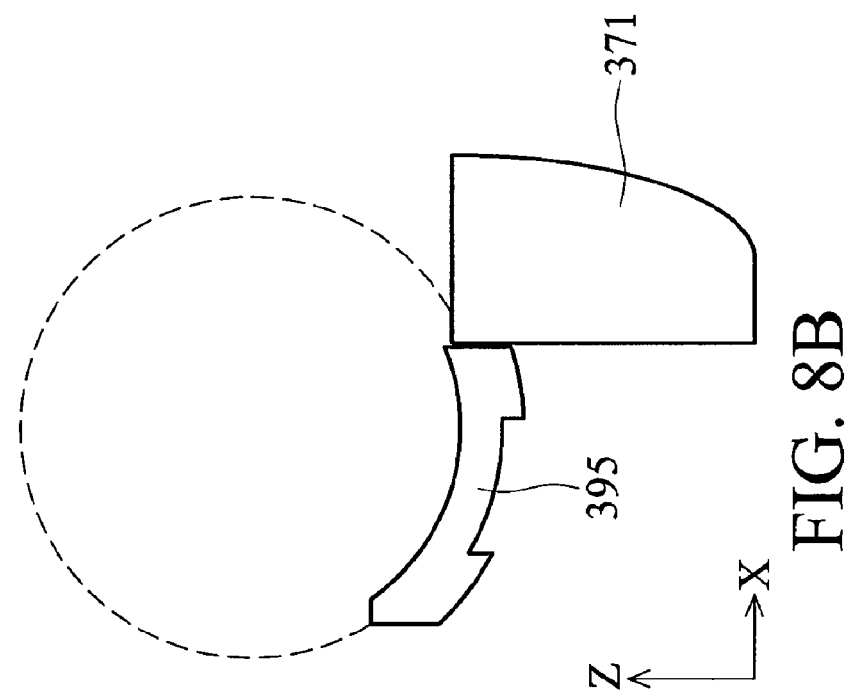
FIGS. 8A and 8B show the relationship of a third protrusion and the second protrusion in the assembled video camera, observed in a direction Y.
Figure 8A:
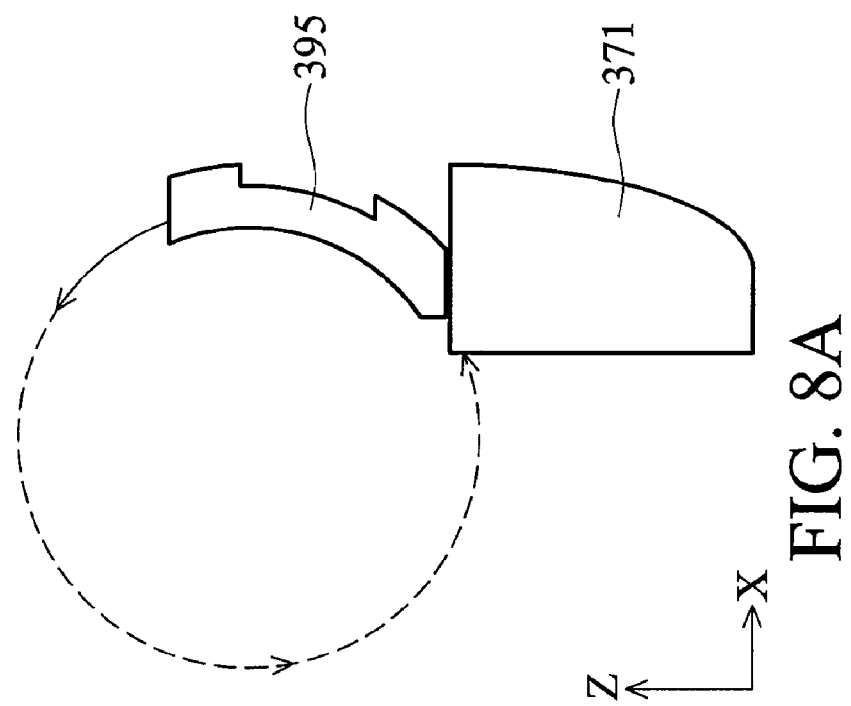

When the video camera 30 is rotated about the Y-axis and the Z-axis, the power and signal cable 33 is rotated together with the video camera 30. The rotational angle of the video camera 30 must be limited to avoid damage to the power and signal cable 33 arising from excessive torsion. FIG. 5 shows a first protrusion 44 provided on the flange 43 of the support stand 40. FIG. 6 shows an L-shaped second protrusion 371 provided on the second cover 37. FIGS. 7A and 7B show the relationship of the first protrusion 44 and the second protrusion 371 in the assembled video camera 30, observed in a direction—Z. When the video camera 30 is rotated about the Z-axis, the second protrusion 371 is rotated together with the video camera 30. Rotation of the video camera 30 continues until the second protrusion 371 contacts the first protrusion 44. Thus, the rotational angle of the video camera 30 about the Z-axis is limited for avoiding damage to the power and signal cable 33 arising from excessive torsion. Furthermore, a third protrusion 395 is provided on the flange 391 of the fourth cover 39. FIGS. 8A and 8B show the relationship of the third protrusion 395 and the second protrusion 371 in the assembled video camera 30, observed in a direction Y. When the video camera 30 is rotated about the Y-axis, the third protrusion 395 is rotated together with the video camera 30. Rotation of the video camera 30 continues until the third protrusion 395 contacts the second protrusion 371. Thus, the rotational angle of the video camera 30 about the Y-axis is limited for avoiding damage to the power and signal cable 33 arising from excessive torsion.

From the above descriptions, it is understood that the invention provides a built-in webcam which has a video camera with more than one degree of rotation for easy adjustment of filming angles and capable of being received in the electronic device when not in use to avoid contamination.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A webcam built in an electronic device, comprising:
a housing;
a video camera being movable between a first location in the housing and a second location outside the housing;
a latching mechanism maintaining the video camera at the first location and the second location and comprising a frame body, two latches, and a connecting link, the latches are movably disposed in the frame body, and the connecting link connects the latches, retracting the latches within the frame body or protruding the latches from the frame body to position the video camera;
a support stand movably disposed in the housing;
wherein the video camera is rotatably mounted on the support stand.

2. The webcam as claimed in claim 1, wherein the latching mechanism further comprises a button connected to the connecting link.

3. The webcam as claimed in claim 1, wherein the support stand comprises a first neck part, the video camera comprises a first cover and a second cover, and the first cover and the second cover respectively comprise first indentations which constitute a first hole, allowing the first neck part to pass through.

4. The webcam as claimed in claim 3, wherein the support stand further comprises a first protrusion, the second cover further comprises a second protrusion, and when the video camera is rotated, the second protrusion is rotated along with the video camera until the second protrusion contacts the first protrusion, thereby limiting rotation of the video camera in an angular range.

5. The webcam as claimed in claim 4, wherein the video camera further comprises a third cover and a fourth cover, the third cover and the fourth cover respectively comprise second neck parts, and the first cover and the second cover further comprise second indentations which constitute a second hole, allowing the second neck parts to pass through, whereby the third cover and the fourth cover are rotatable with respect to the first cover and the second cover.

6. The webcam as claimed in claim 5, wherein the fourth cover further comprises a third protrusion, and when the third and fourth covers are rotated with respect to the first and second covers, the third protrusion is rotated along with the fourth cover until the third protrusion contacts the second protrusion, thereby limiting rotation of the third and fourth covers in another angular range.

7. The webcam as claimed in claim 6, wherein the video camera further comprises a screw fastening the first cover and the second cover together.

8. The webcam as claimed in claim 1, wherein the latching mechanism further comprises a spring disposed between the connecting link and the frame body.

9. The webcam as claimed in claim 1, wherein the support stand comprises a bump, the video camera is maintained at the first location when the bump contacts one of the latches projected from the frame body, and the video camera is maintained at the second location when the bump contacts the other latch projected from the frame body.

10. The webcam as claimed in claim 1, wherein the latches have resilient parts, and when the latches are retracted within the frame body, the resilient parts abut the frame body and are compressed.

11. The webcam as claimed in claim 1, wherein the connecting link comprises a first inclined surface, each of the latches comprises a second inclined surface, the connecting link pushes the second inclined surface via the first inclined surface so as to project or retract the latches.

12. The webcam as claimed in claim 11, wherein each of the latches defines a through hole for the connecting link to pass through, and the second inclined surface is disposed in the through hole.

13. The webcam as claimed in claim 1, further comprising a bottom cover connected to the housing.

14. The webcam as claimed in claim 13, further comprising a spring disposed between the support stand and the bottom cover.

* * * * *